(12) United States Patent
Van Damme

(10) Patent No.: US 10,827,765 B2
(45) Date of Patent: Nov. 10, 2020

(54) LOW CALORIE FOOD COMPOSITIONS

(71) Applicant: MARS, INCORPORATED, McLean, VA (US)

(72) Inventor: Isabella Bernarda Maximilienne Van Damme, Slough (GB)

(73) Assignee: Mars, Incorporated, McLean, VA (US)

( * ) Notice: Subject to any disclaimer, the term of this patent is extended or adjusted under 35 U.S.C. 154(b) by 36 days.

(21) Appl. No.: 15/738,038

(22) PCT Filed: Jun. 17, 2016

(86) PCT No.: PCT/US2016/038117
§ 371 (c)(1),
(2) Date: Dec. 19, 2017

(87) PCT Pub. No.: WO2016/205677
PCT Pub. Date: Dec. 22, 2016

(65) Prior Publication Data
US 2018/0303120 A1 Oct. 25, 2018

(30) Foreign Application Priority Data

Jun. 19, 2015 (GB) .................................. 1510775.8

(51) Int. Cl.
*A23G 1/40* (2006.01)
*A23L 33/24* (2016.01)
*A23G 1/54* (2006.01)

(52) U.S. Cl.
CPC .............. *A23G 1/40* (2013.01); *A23G 1/54* (2013.01); *A23L 33/24* (2016.08); *A23V 2002/00* (2013.01)

(58) Field of Classification Search
None
See application file for complete search history.

(56) References Cited

U.S. PATENT DOCUMENTS

| 5,366,962 A | 11/1994 | Biton et al. |
| 2004/0217063 A1 | 11/2004 | Zhang et al. |
| 2009/0280098 A1* | 11/2009 | Tabata ................... A23K 10/18 424/93.41 |

FOREIGN PATENT DOCUMENTS

| EP | 0345199 | 6/1989 |
| EP | 1930012 A1 | 6/2008 |
| JP | 2008001668 A | 1/2008 |
| JP | 2009100658 A | 5/2009 |
| JP | 2009125064 A | 6/2009 |
| JP | 2009142187 A | 7/2009 |
| JP | 2010200715 A | 9/2010 |
| JP | 2010226995 A | * 10/2010 |
| WO | WO 95/00037 | * 1/1995 |

OTHER PUBLICATIONS

Yamazaki, Y. (JP 2010 226995A—Machine translation of Description) (Year: 2010).*
Great Britain Search Report in application No. GB1510775.8, dated Dec. 14, 2015, 3 pages.
International Search Report in PCT/US2016/038117, dated Aug. 30, 2016, 4 pages.
Nakamura et al., "Bioavailability of cellobiose by tolerance test and breath hydrogen excretion in humans," Nutrition, Nov.-Dec. 2004, 20(11-12):979-83.

* cited by examiner

*Primary Examiner* — Elizabeth Gwartney
(74) *Attorney, Agent, or Firm* — Fish & Richardson P.C.

(57) ABSTRACT

A food composition comprising a cellodextrin material, wherein the cellodextrin material comprises a principal cellodextrin with a degree of polymerisation (DP) value of at least 4. Food products comprising the composition, and cellodextrin materials used in the preparation of the composition as well as method for preparing these form further aspects of the invention.

13 Claims, No Drawings

LOW CALORIE FOOD COMPOSITIONS

The present invention relates to food compositions, in particular, low calorie food compositions as well as to materials for use therein, as well as their method of production and use in the production of food products.

BACKGROUND OF THE INVENTION

Obesity is a growing problem in the world. According to the World Health Organization website (http://www.who.int/mediacentre/factsheets/fs311/en/ factsheet 113, dated March 2013), worldwide obesity has nearly doubled since 1980.

There is a need, therefore, to produce low calorific alternatives to high calorific food products. Confectionery products such as chocolate products (whether with or without fillings) typically have a relative high calorific content compared to other foods. There is a desire from consumers to have lower calorific alternatives to such confectionery products yet with the taste and mouth-feel of the original product.

Many attempts have been made to replace sucrose in such products with other less calorific alternatives. Examples include fructose, inulin, erythritol and cellobiose.

Cellobiose belongs to a group of compounds called cellooligosaccharides or cellodextrins. Cellodextrins/cellooligosaccharides are intermediate products created upon the breakdown, and in particular the enzymatic breakdown or acid mediated breakdown, of cellulose to glucose. Cellodextrins exist in various forms and are often classified in accordance with their degree of polymerisation (DP), the DP indicating the number of glucose monomers present in the cellodextrin. Common names for some of these cellodextrins include: cellobiose (DP=2), cellotriose (DP=3), cellotetraose (DP=4), cellopentaose (DP=5), cellohexaose (DP=6). Depending upon their method of manufacture, they may be in the form of mixtures. Cellodextrin materials can include one or more of these cellodextrin forms. The average DP of a cellodextrin material depends on the types and amounts of the cellodextrin forms in the cellodextrin material.

Such compounds can be made in various ways such as biosynthesis from monomers, enzymatic hydrolysis of cellulose as well as chemical synthesis.

Cellobiose has been suggested as a prebiotic compound because although mostly non-digestable by humans due to the B-1,4 linkage present, it is thought to be readily fermented by bacteria in our digestive system. Prebiotics are suggested to have health benefits by encouraging growth of desirable bacteria in our gut. Given its non-digestibility, cellobiose has also been suggested as a low calorie sugar replacer, partly due to its sweetness, but also because of its ability to act as a bulking agent. There remains a need for alternative low-calorie sugar alternatives, particularly for use in confectionery products such as chocolate.

Prebiotics such as cellobiose encourage gut bacteria to grow and ferment. This is generally regarded as being beneficial since many of the gut bacteria are 'friendly bacteria' providing positive health effects.

Since cellobiose is virtually non-digestible to humans, it is also suggested as a low-calorie sugar alternative.

Some food compositions containing cellodextrins and including some higher (greater than 3) DP values have been described in the art, for example in EP-345199 or JP2009125064. Typically, however, the higher DP cellodextrin within a single composition represents a minor amount (less than 50%/o w/w and typically less than 20% w/w) of the total cellodextrin content, and cellbiose will generally be present as a preferred component.

Contrary to the general understanding in the art, the applicants have found that cellobiose has undesirable side effects when used in food compositions and in particular solid or semi-solid foodstuffs. Specifically, the undesirable side effects include stomach cramps, nausea, diarrhea and loss of appetite. Such unpleasant side effects were not observed to such a great degree when the cellobiose was administered to humans as a drink (Nakamura, Nutrition 20 (2004) 979-983).

SUMMARY OF THE INVENTION

The applicants have developed novel cellodextrin compositions for food use.

In the first aspect of the invention, there is provided a food composition comprising a cellodextrin material, wherein the cellodextrin material comprises a principal cellodextrin with a degree of polymerisation (DP) value of at least 4.

As used herein, "principal cellodextrin" is defined as a single cellodextrin form which is present in the cellodextrin material comprising it in an amount of more than 50% weight by weight of the total weight of cellodextrins. By selecting a DP value of at least 4, the cellodextrin material of the invention comprises a principal cellodextrin that is not cellobiose or cellotriose.

By incorporating cellodextrin material where at least a substantial proportion of the cellodextrin material has a DP of 4 or more, unpleasant side effects are reduced. Without being bound by theory, this may be due to the fact that gut bacteria are less able to ferment the higher DP cellodextrins and therefore, the probiotic effect is reduced or eliminated. In a particular embodiment, the cellodextrin material does not contain cellobiose, and in particular does not contain cellobiose or cellotriose.

In one embodiment of the first aspect of the invention, the principal cellodextrin of the cellulose material has a DP value of between 4 to 8 inclusive. For example, in some embodiments, the principal cellodextrin may be selected from cellotetraose, cellopentaose, cellohexaose.

In a second embodiment of the first aspect of the invention, the food composition comprises a celodextrin material wherein the principal cellodextrin has a DP value of at least 8.

In a third embodiment of the first aspect of the invention, the principal cellodextrin defined above is present in the quantities of more than 51%, more than 55%, more than 60%, more than 70%, more than 75%, more than 80%, more than 90% or 100% w/w of the total cellodextrin material found in the food composition.

In a further embodiment of the first aspect of the invention, the cellodextrin material is soluble in water. The use of soluble materials in food production is advantageous due to the fact that water soluble materials are readily handled. The cellodextrin materials may be readily substituted in place of some or all of any high calorie sweetener used in food production, such as sugars, e.g., sucrose or lactose.

In general, the food compositions will contain one or more additional ingredients used in food production, such as fats, proteins, carbohydrates such as non-sugar type carbohydrates etc.

Thus, food compositions in accordance with the invention may be similar in all respects to the compositions used in the production of conventional food products, with the exception that some or all of the sugar (such as sucrose or lactose) present in that product is replaced with a cellodextrin material as defined above.

Thus, in a second aspect of the invention, there is provided a food product, said product comprising a food composition as defined above. The product is generally a processed food product where the food composition has been processed, for example shaped or mixed with other components, to form a final product ready for sale to the public. In one embodiment of the second aspect of the invention, the food product does not contain sugar. In this case, the cellodextrin material replaces all of the sugar that would conventionally be present in the product, meaning that the product has a lower calorific value.

In another embodiment, the cellodextrin material replaces only some of the sugar found in the conventional product, for example from 10-90% w/w of the sugar found in the conventional product. The relative amount of cellodextrin material that may be used to replace the sugar will depend upon various factors including the nature of the product, the levels of sweetness required and the precise composition of the cellodextrin material utilized.

In some embodiments, additional sweeteners may be added to the products to compensate for any loss of sweetness or flavour provided by the use of the cellodextrin material in the product. Thus, the food product may comprise an added sugar, but in particular it comprises a sweetener that is not sucrose, so as to maintain a low calorific value.

In one embodiment, the food product comprising the food composition as described above is a confectionery product. Examples of confectionery products include but are not limited to chocolate, non-standardized chocolate, and chocolate products comprising one or more fillings, such as cream fillings, caramel, honeycomb and nougat.

In the third aspect of the invention, there is provided the use of the cellodextrin material as described above in the preparation of a food composition. In one embodiment of the third aspect of the invention, the food composition further comprises a sweetener that is not sucrose. In one embodiment of the third aspect of the invention, the food composition is one that is used to prepare a confectionery product.

Certain cellodextrin materials used in the food compositions are novel and these form a further aspect of the invention.

Thus in a fourth aspect of the invention, there is provided a cellodextrin material comprising a principal cellodextrin with a degree of polymerisation (DP) value of at least 4 and at least one further cellodextrin. Suitably the further cellodextrin is not cellobiose, and in particular also has a DP value of at least 4.

In a fifth aspect of the invention, there is provided a method of manufacturing the cellodextrin material used in the food composition of the first aspect of the invention or the food product of the second aspect of the invention, or the cellodextrin material of the fourth aspect. The cellodextrin material is suitably prepared by mixing the required cellodextrin components in pure form, in the required amounts. This method has the advantage of allowing maximal control and flexibility in the preparation. Thus, a principal cellodextrin, having a DP value of at least 4, is chosen and is optionally mixed with one or more other cellodextrins such that it is present in the resulting material in an amount in excess of 50% w/w.

Alternatively, the cellodextrin material may be prepared by hydrolysis, for example enzymatic or acid hydrolysis of cellulose under conditions which result in the production of a cellodextrin material as defined herein. The conditions used will vary depending upon various factors such as the nature of any enzymes or chemicals used in the hydrolysis, the temperatures used and the time that the hydrolysis reaction is continued. These may be determined by routine methods.

The resulting cellodextrin material may be used to prepare a food composition according to a first aspect of the invention and/or a food product of the second aspect of the invention.

Thus, in a sixth aspect of the invention, there is provided a method for preparing a food composition or a food product such as a confectionary product as described above, the method comprising the steps of:
a. making the food composition and/or food product in accordance with known methods but without adding all or some of the sugar normally found in the food composition;
b. adding the cellodextrin material as described herein to the food composition.

In one example, the principal cellodextrin of the cellodextrin material mentioned in step (b) has a DP value of at least 4.

In a seventh aspect of the invention, there is provided a method for reducing calorie intake of a human or animal, by substituting either (i) a sugar-containing food composition with the food composition of the first aspect of the invention, or (ii) a food product according to the second aspect of the invention for a similar conventional food product, supplied to said human or animal. Suitably what is supplied to the human or animal is a confectionery product comprising a food composition of the first aspect of the invention.

For ease of use in food production, the cellodextrin material may be formulated as a 'bulking agent'. Convenient bulking agents will contain an additional ingredient required in the production of a particular food product in the required ratio. Suitable ratios of cellodextrin material:additional ingredient will vary depending upon the nature of the additional ingredient and the desired result, but may typically be in the range of from 2:8 to 9:1. In particular the additional ingredient would be a carbohydrate sweetener.

Thus, in an eighth aspect of the invention, there is provided a bulking agent comprising a cellodextrin material and a carbohydrate sweetener wherein the cellodextrin material comprises a principal cellodextrin as defined herein with a DP of at least 4. In one embodiment of the eighth aspect of the invention, the carbohydrate sweetener is selected from the group consisting of sucrose, dextrose, maltose, fructose, galactose, corn syrup solids, lactose, glucose syrup solids, invert sugar, hydrolyzed lactose, honey, maple sugar, brown sugar, molasses, sorbitol, hydrogenated isomaltulose, mannitol, xylitol, lactitol, erythritol, hydrogenated starch hydrolysate, maltitol, polydextrose, maltodextrin, and combinations thereof. Preferably, the carbohydrate sweetener is a high intensity sweetener. More preferably, the high intensity sweetener is selected from the group consisting of aspartame, cyclamates, saccharin, acesulfame-K, neohesperidin dihydrochalcone, sucralose, alitame, *stevia* sweeteners, steviosides, rebaudiosides, glycyrrhizin, thaumatin, and combinations thereof.

In a particular embodiment, the bulking agent comprises a cellodextrin material comprising a cellodextrin selected from the group consisting of cellotetraose, cellopentaose, cellohexaose, and mixtures thereof, and a carbohydrate sweetener. In another embodiment, the carbohydrate sweetener is selected from the group consisting of sucrose, dextrose, maltose, fructose, galactose, corn syrup solids, lactose, glucose syrup solids, invert sugar, hydrolyzed lactose, honey, maple sugar, brown sugar, molasses, sorbitol, hydrogenated isomaltulose, mannitol, xylitol, lactitol, erythritol, hydrogenated starch hydrolysate, maltitol, polydextrose, maltodextrin, and combinations thereof. Preferably, the carbohydrate sweetener is a high intensity sweetener. More preferably, the high intensity sweetener is selected from the group consisting of aspartame, cyclamates, saccharin, acesulfame-K, neohesperidin dihydrochalcone, sucralose, alitame, *stevia* sweeteners, steviosides, rebaudiosides, glycyrrhizin, thaumatin, and combinations thereof.

In a ninth aspect of the invention, there is provided a bulking agent comprising a cellodextrin having a DP of at least 4, and a carbohydrate sweetener. In one embodiment of the eighth aspect of the invention, more than 50% of the cellodextrins have a DP of at least 4. In one example, 50% of the cellodextrins have a DP of between 4 to 8 inclusive. In one embodiment of the ninth aspect of the invention, the carbohydrate sweetener is selected from the group consisting of sucrose, dextrose, maltose, fructose, galactose, corn syrup solids, lactose, glucose syrup solids, invert sugar, hydrolyzed lactose, honey, maple sugar, brown sugar, molasses, sorbitol, hydrogenated isomaltulose, mannitol, xylitol, lactitol, erythritol, hydrogenated starch hydrolysate, maltitol, polydextrose, maltodextrin, and combinations thereof. Preferably, the carbohydrate sweetener is a high intensity sweetener. More preferably, the high intensity sweetener is selected from the group consisting of aspartame, cyclamates, saccharin, acesulfame-K, neohesperidin dihydrochalcone, sucralose, alitame, *stevia* sweeteners, steviosides, rebaudiosides, glycyrrhizin, thaumatin, and combinations thereof.

DETAILED DESCRIPTION

As used herein, the expression "food composition" does not include drinks or beverages, but rather, a food composition is typically something more solid or semi-solid in character. Examples of food compositions are mixtures of ingredients for use in the production of food products such as confectionery products and cakes and biscuits. The food composition is intended to be suitable for human or mammalian consumption.

Cellodextrin and cellooligosaccharides are used interchangeably in the art to describe reaction intermediates produced during the hydrolysis of cellulose to glucose. Hence, they have the same basic chemical structure as cellulose but with shorter chain lengths. Such molecules can be produced in a variety of ways, including but not limited to (bio)synthesis from monomers, chemical lysis of cellulose or enzymatic hydrolysis of cellulose. Most anaerobic bacteria can produce cellodextrins by means of its "cellulosome" (an amalgamation of cellulolytic enzymes on the outside of a cell) wherein an endoglucanase first cuts the crystalline cellulose in an amorphous zone and exoglucanases subsequently cleave these large insoluble chunks of cellulose into smaller, soluble cellodextrins which can be used by the cell.

The terms "cellodextrin" and "cellooligosaccharide", as used herein, are used interchangeably and include any products that can be created during the breakdown of cellulose to glucose, regardless of the manner in which these breakdown products are produced.

Suitable cellodextrins for the performance of this invention include but are not limited to cellotetraose, cellopentaose, cellohexaose and mixtures thereof. Such compounds can be purchased from suppliers such as Carbosynth Limited (UK). Methods of making such cellodextrins are well known in the art, for example, methods of making cellodextrins are described in US2004/0217063.

As used herein, references to the cellodextrin 'replacing' all the sugar or some of the sugar found in a food composition or food product means that some or all of the sugar typically found in such a food composition or product is substituted with a cellodextrin material as described herein. For example, a particular chocolate bar recipe will have a certain amount of sugar listed. If the amount of sugar is decreased or eliminated and cellodextrin is used in the recipe instead, then this is a situation where replacement has occurred. Since the perceived sweetness of 1 g of sugar and 1 g of a particular cellodextrin is not the same, then this phrase is not intended to be limited to a 1:1 replacement of sugar with cellodextrin. Instead, if the percentage of sugar used is decreased and some cellodextrin is used to increase the sweetness of the food product, then this would fall within the definition. This definition also includes scenarios where cellodextrin is added to the food composition in combination with a sweetener.

The definition of "confectionery product" is well-understood by a skilled person. Included in "confectionery product" as used herein are candies, chocolate, non-standardized chocolate, filled chocolate products (e.g. Snickers™), caramels, and honeycomb such as is found in e.g. Crunchie™ and nougat.

The term "chocolate" is intended to refer to all chocolate or chocolate-like compositions with a fat phase or fat-like composition whether used in isolation, as a coating or chocolate couverture etc. The term is intended, for example, to include standardized and non-standardized chocolates, i.e., including chocolates with compositions conforming to the U.S. Standards Of Identity (SOI) and compositions not conforming to the U.S. Standards Of Identity, respectively, including dark chocolate, baking chocolate, milk chocolate, sweet chocolate, semi-sweet chocolate, buttermilk chocolate, skim-milk chocolate, mixed dairy product chocolate, low fat chocolate, white chocolate, aerated chocolates, compound coatings, non-standardized chocolates and chocolate-like compositions, unless specifically identified otherwise. Chocolate herein also includes those containing crumb solids or solids fully or partially made by a crumb process.

Non-standardized chocolates are those chocolates which have compositions which fall outside the specified ranges of the standardized chocolates. Non-standardized chocolates result when, for example, the nutritive carbohydrate sweetener is replaced partially or completely: or when the cocoa butter or milkfat are replaced partially or completely; or when components that have flavors that imitate milk, butter or chocolate are added or other additions or deletions in formula are made outside the FDA standards of identity of chocolate or combinations thereof.

As used herein, "sweetener" is defined as anything that is present in a food composition that imparts a quality of sweetness to the food composition. Such sweetness can be detected by the consumer of the food composition. Examples of such sweeteners include sucrose, sugar alcohols and high intensity sweeteners such as sucralose. In one embodiment, the sweetener is not sucrose.

The invention will now be particularly described by way of example.

EXAMPLES

Comparative Example 1—Chocolate Containing Cellobiose—Testing

A panel of 10 assessors were used to evaluate sensory differences between cellobiose containing (2 levels; 75% and 100% sucrose substitution) and standard chocolate.

Test Design

The maximum amount of cellobiose consumed during one 3 hour sensory session was set at 20 g and 8 g respectively (100% cellobiose sample contained 49.5 g cellobiose/100 g, 75% cellobiose sample contained 34.7 g/100 g and 60% inulin sample contained 29.7 g inulin/100 g).

All testing was carried out at room temperature in an air conditioned room and in individual booths. Data was collected using Fizz Network software (Biosystemes, France).

For each attribute, panelists were presented with all samples (~3.5 g sample size) allowing comparative assessment. Panelists first determined rank order and then assigned ratings using separate line scales for each sample/attribute.

All samples were presented in 2 oz plastic pots labelled with random 3 digit codes. Panelists were provided with unsalted cracker (Rakusen, U.K.), green apple slices and mineral water (Evian, France) for palate cleansing. Attributes were assessed in blocks of 2 followed by 15 mins rest breaks.

Data Analysis

Data was examined at an individual panelist level initially to assess panel performance. The ability of the panelists to discriminate between the samples was examined using coefficient of variance (CV) ANOVA data (indicating reproducibility of panelists replicate intensity scores) plotted against probability (level of discrimination between products). Final panel results were analyzed using Friedman Test for rank data and 2 way ANOVA (factors; sample and judge) for rating data, using Fizz software (Biosystemes, France). Significant differences between samples ($p<0.05$) were evaluated post hoc using Tukey's HSD.

Results and Discussion

Gastro-Intestinal Symptoms

A number of gastro-intestinal symptoms were reported by the panelists in the 24 hours following the sensory sessions, the most common being flatulence (10/10 on at least 1 occasion) and bowel sounds (8/10 on at least 1 occasion). Some degree of abominable discomfort was reported by 7/10 panelists on 1 or more occasions and 5 out of the 10 panelists suffered diarrhea following 1 or more sessions. A summary of reported GI symptoms, together with severity ranges, is shown in Table 1. A previous tolerability study carried out using cellobiose (H-09-2011) examined GI effects when cellobiose was delivered in a water based solution and used only male subjects aged between 18-35 yrs. The number and severity of symptoms seen in this study was not expected given the previous tolerability results where cellobiose was consumed as a drink (10, 20, 30 or 50 g of cellobiose was dissolved in 200 ml of hot water and allowed to cool to room temperature overnight). In that study (data not shown), mild or no abdominal symptoms were reported by the volunteers after receiving 10 g and 20 g of cellobiose. With the consumption of 30 g, 4 people (31%) experienced short duration abdominal pain (ranging in severity from 1 to 3 out of 5), 2 people (15%) reported mild flatulence (severity 1 out of 5) and one person reported this at a severity of 3 out of 5. After the 50 g dose, 1 person had a single episode of diarrhea 2 h after consuming the cellobiose and 1 reported diarrhea in the first 24 h. Six subjects (46%) reported flatulence (range 1-4 out of 5), and 4 experienced abdominal pain (severity between 1-2 out of 5). Three quarters of subjects were happy to take part in future studies involving the ingestion of cellobiose, even at the highest dose.

Example 2 Recipe Examples

Below are examples of recipes comprising the cellodextrin materials of invention that could be carried out by a skilled person. Methods of making the chocolate or caramel etc. (without cellodextrins) are well known to skilled artisans and can also be found in textbooks such as Chocolate, Cocoa and Confectionery, Bernard W. Minifie third edition, which is incorporated herein by reference. The substitution of sucrose in such methods with cellodextrin could be readily accomplished by a skilled artisan when furnished with the information described herein.

Total Substitution of Sucrose with Cellodextrins

Dry Mix:

| Ingredient | Milk chocolate % | White chocolate % | Dark chocolate % |
| --- | --- | --- | --- |
| Cellodextrin | 44 | 45 | 30 |
| Skimmed Milk powder | 21.57 | 23.57 | 0 |
| Anydrous milk fat | 4 | 4 | 3 |
| Cooca butter | 22 | 27 | 20 |
| Cocoa liquor | 14 | 0 | 46.47 |
| Emulsifier and flavouring | 0.4 | 0.4 | 0.4 |
| High potency sweetener: sucralose | 0.03 | 0.03 | 0.03 |

Crumb Powder: Example Recipes

| Ingredient | Milk Chocolate crumb % | White crumb % |
| --- | --- | --- |
| Cellodextrin | 52 | 55 |
| Whole milk | 28 | 34 |
| Cooca butter | | 11 |
| Cocoa liquor | 20 | 0 |

Crumb Chocolate Made with the Crumb Powders:

| Ingredient | Milk chocolate % | White chocolate % |
| --- | --- | --- |
| Crumb powder | 80 | 45 |
| Cooca butter | 19.37 | 27 |
| Emulsifier and flavouring | 0.6 | 0.6 |
| High potency sweetener: sucralose | 0.03 | 0.03 |

Partial Substitution of Sucrose with Cellodextrins

Dry Mix: 75% of Sucrose Replaced by Cellodextrins

| Ingredient | Milk chocolate % | White chocolate % | Dark chocolate % |
| --- | --- | --- | --- |
| Sucrose | 11 | 11.2 | 7.5 |
| Cellodextrin | 33 | 33.8 | 22.5 |
| Skimmed Milk powder | 21.6 | 23.6 | 0 |

-continued

| Ingredient | Milk chocolate % | White chocolate % | Dark chocolate % |
|---|---|---|---|
| Anydrous milk fat | 4 | 4 | 3 |
| Cooca butter | 22 | 27 | 20 |
| Cocoa liquor | 14 | 0 | 46.6 |
| Emulsifier and flavouring | 0.4 | 0.4 | 0.4 |
| High potency sweetener: sucralose | 0.02 | 0.02 | 0.02 |

Crumb Powder: 75% of Sucrose Replaced by Cellodextrins

| Ingredient | Milk Chocolate crumb % | White crumb % |
|---|---|---|
| Sucrose | 13 | 41.3 |
| Cellodextrin | 39 | 33.7 |
| Whole milk | 28 | 34 |
| Cooca butter | | 11 |
| Cocoa liquor | 20 | 0 |

Crumb Chocolate Made with the Crumb Powders:

| Ingredient | Milk chocolate % | White chocolate % |
|---|---|---|
| Crumb powder | 80 | 45 |
| Cooca butter | 19.37 | 27 |
| Emulsifier and flavouring | 0.6 | 0.6 |
| High potency sweetener: sucralose | 0.03 | 0.03 |

Caramel

This formulation is cooked so that 15% water remains in the cooked caramel.

TABLE 1

| Ingredient | % |
|---|---|
| glucose syrup | 35 |
| Cellodextrin | 10.6 |
| Sucrose | 7 |
| Sweetened condensed milk | 35 |
| Fat | 12 |
| Salt | 0.4 |

The invention claimed is:

1. A confectionery composition comprising a cellodextrin material, wherein the cellodextrin material comprises a principal cellodextrin with a degree of polymerization (DP) value of at least 4, wherein the cellodextrin material is selected from the group consisting of cellotetraose, cellopentaose, cellohexaose, and mixtures thereof, and wherein the confectionery composition does not contain cellobiose.

2. The confectionery composition of claim 1, wherein the principal cellodextrin has a DP value of from 4 to 8 inclusive.

3. The confectionery composition of claim 1, wherein the principal cellodextrin comprises at least 51% of the total cellodextrin material in the confectionery composition.

4. The confectionery composition of claim 1, wherein the cellodextrin material is soluble in water.

5. The confectionery composition of claim 1, wherein the confectionery composition further comprises a fat, a protein or another carbohydrate.

6. The confectionery composition of claim 1, wherein the confectionery composition is selected from the group consisting of chocolate, non-standardized chocolate, and filled chocolate product.

7. The confectionery composition of claim 5, wherein the confectionery composition further comprises a sweetener that is not sucrose.

8. The confectionery composition of claim 1, wherein the principal cellodextrin comprises more than 60% w/w of the total cellodextrin material in the confectionery composition.

9. The confectionery composition of claim 1, wherein the principal cellodextrin comprises more than 70% w/w of the total cellodextrin material in the confectionery composition.

10. A confectionery composition comprising cellodextrin material that comprises a principal cellodextrin with a DP value of at least 4, wherein the principal cellodextrin comprises more than 55% w/w of the total cellodextrin material found in the confectionery composition.

11. The confectionery composition of claim 10, wherein the principal cellodextrin comprises more than 60% w/w of the total cellodextrin material in the confectionery composition.

12. The confectionery composition of claim 10, wherein the principal cellodextrin comprises more than 70% w/w of the total cellodextrin material in the confectionery composition.

TABLE 1

Summary of gastro-intestinal symptoms following sensory sessions

| ID | symptoms (y/n) | abdom pain sessions out of 7 | abdom pain severity range | bloating sessions out of 7 | bloating severity range | flatulence sessions out of 7 | flatulence severity range | bowel sounds sessions out of 7 | bowel sounds severity range | other |
|---|---|---|---|---|---|---|---|---|---|---|
| 1 | y | 0 | | 0 | | 7 | 1 | 1 | 1 | |
| 2 | y | 0 | | 0 | | 4 | 1-4 | 2 | 2-4 | |
| 3 | y | 4 | 2-3 | 5 | 2-4 | 4 | 3-4 | 2 | 1 | stomach cramps 1 occasion |
| 4 | y | 2 | 3-4 | 1 | 2 | 5 | 1-4 | 1 | 4 | nausea, diarrhoea, 1 occasion each |
| 5 | y | 1 | 3 | 2 | 2-3 | 3 | 2-5 | 3 | 2-5 | diarrhoea on 2 occasions |
| 6 | y | 2 | 1-3 | 0 | | 2 | 1 | 0 | | nausea on 1 occasion |
| 7 | y | 1 | 2 | 0 | | 2 | 1-3 | 2 | 2-3 | diarrhoea on 2 occasions |
| 8 | y | 3 | 3-5 | 2 | 2-5 | 4 | 2-3 | 6 | 2-5 | loss of appetite and diarrhoea on 3 occasions. |
| 9 | y | 0 | 0 | 0 | | 1 | 1 | 1 | 2 | |
| 10 | y | 2 | 3 | 1 | 2 | 2 | 1-5 | 0 | | diarrhoea on 1 occasion |

13. The confectionery composition of claim 10, wherein the confectionery composition does not contain cellobiose.

\* \* \* \* \*

UNITED STATES PATENT AND TRADEMARK OFFICE
CERTIFICATE OF CORRECTION

PATENT NO. : 10,827,765 B2
APPLICATION NO. : 15/738038
DATED : November 10, 2020
INVENTOR(S) : Isabella Bernarda Maximilienne Van Damme It is certified that error appears in the above-identified patent and that said Letters Patent is hereby corrected as shown below:

In the Claims

Column 10, Line 15, in Claim 3:
After "51%" insert -- w/w --.

Column 10, Line 40, in Claim 10:
Before "in" delete "found".

Signed and Sealed this
Eighth Day of November, 2022

Katherine Kelly Vidal
*Director of the United States Patent and Trademark Office*